United States Patent
Harasin et al.

(10) Patent No.: US 10,647,911 B2
(45) Date of Patent: May 12, 2020

(54) COATED PARTICLES, METHODS FOR THEIR MANUFACTURE AND FOR THEIR USE AS PROPPANTS

(71) Applicant: Covestro LLC, Pittsburgh, PA (US)

(72) Inventors: Stephen J. Harasin, Morgan, PA (US); Kenneth R. Riddle, Ambridge, PA (US); Michael T. Wellman, Moundsville, WV (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 16/459,720

(22) Filed: Jul. 2, 2019

(65) Prior Publication Data

US 2019/0330521 A1 Oct. 31, 2019

Related U.S. Application Data

(62) Division of application No. 15/682,595, filed on Aug. 22, 2017, now Pat. No. 10,385,261.

(51) Int. Cl.
| | | |
|---|---|---|
| *C09K 8/80* | (2006.01) | |
| *C09D 175/06* | (2006.01) | |
| *E21B 43/267* | (2006.01) | |
| *E21B 43/26* | (2006.01) | |
| *C08G 18/66* | (2006.01) | |
| *C08L 75/04* | (2006.01) | |
| *C08G 18/24* | (2006.01) | |
| *C08G 18/28* | (2006.01) | |
| *C08G 18/78* | (2006.01) | |
| *C09K 8/62* | (2006.01) | |
| *C08G 18/76* | (2006.01) | |
| *C08G 18/32* | (2006.01) | |
| *C08G 18/42* | (2006.01) | |

(52) U.S. Cl.
CPC ............ *C09K 8/805* (2013.01); *C08G 18/246* (2013.01); *C08G 18/289* (2013.01); *C08G 18/6651* (2013.01); *C08G 18/7671* (2013.01); *C08G 18/7843* (2013.01); *C08L 75/04* (2013.01); *C09D 175/06* (2013.01); *E21B 43/26* (2013.01); *E21B 43/267* (2013.01); *C08G 18/3237* (2013.01); *C08G 18/4288* (2013.01); *C08G 18/7664* (2013.01); *C09K 8/62* (2013.01)

(58) Field of Classification Search
CPC .... C09K 8/805; C08G 18/246; C08G 18/289; C08G 18/6651; C08G 18/7671; C08G 18/7843; E21B 43/26; E21B 43/267
See application file for complete search history.

(56) References Cited

U.S. PATENT DOCUMENTS

| | | |
|---|---|---|
| 3,644,457 A | 2/1972 | Konig et al. |
| 4,920,192 A | 4/1990 | Wiser-Halladay |
| 5,048,608 A | 9/1991 | Wiser-Halladay et al. |
| 5,081,204 A | 1/1992 | Sarpeshkar et al. |
| 5,199,491 A | 4/1993 | Kutta et al. |
| 5,266,714 A | 11/1993 | Stoll et al. |
| 5,302,626 A | 4/1994 | Hoefer et al. |
| 5,485,882 A | 1/1996 | Bailey et al. |
| 5,501,274 A | 3/1996 | Nguyen et al. |
| 5,582,249 A | 12/1996 | Caveny et al. |
| 5,697,440 A | 12/1997 | Weaver et al. |
| 5,775,425 A | 7/1998 | Weaver et al. |
| 5,787,986 A | 8/1998 | Weaver et al. |
| 5,791,415 A | 8/1998 | Nguyen et al. |
| 5,819,851 A | 10/1998 | Dallas |
| 5,833,000 A | 11/1998 | Weaver et al. |
| 5,839,510 A | 11/1998 | Weaver et al. |
| 5,924,488 A | 7/1999 | Nguyen et al. |
| 5,960,880 A | 10/1999 | Nguyen et al. |
| 5,962,541 A | 10/1999 | Peterson et al. |
| 6,059,034 A | 5/2000 | Rickards et al. |
| 6,079,492 A | 6/2000 | Hoogteijling et al. |
| 6,155,348 A | 12/2000 | Todd |
| 6,225,262 B1 | 5/2001 | Irwin et al. |
| 6,257,335 B1 | 7/2001 | Nguyen et al. |
| 6,330,916 B1 | 12/2001 | Rickards et al. |
| 6,364,018 B1 | 4/2002 | Brannon et al. |
| 6,582,819 B2 | 6/2003 | McDaniel et al. |
| 6,599,863 B1 | 7/2003 | Palmer et al. |
| 6,632,527 B1 | 10/2003 | McDaniel et al. |
| 6,668,926 B2 | 12/2003 | Nguyen et al. |

(Continued)

FOREIGN PATENT DOCUMENTS

| | | |
|---|---|---|
| CA | 2580304 A | 9/2007 |
| CA | 2852199 A | 10/2015 |
| CA | 2911139 A | 5/2016 |
| WO | 10132362 A2 | 11/2010 |
| WO | 12104190 A1 | 8/2012 |
| WO | 15081080 A1 | 6/2015 |
| WO | 16089599 A1 | 6/2016 |
| WO | 16112013 A1 | 7/2016 |

(Continued)

OTHER PUBLICATIONS

Conner et al.; U.S. Appl. No. 62/413,035; "Antimicrobial Proppant"; filed Oct. 26, 2016; Covestro LLC, Pittsburgh, PA.

(Continued)

*Primary Examiner* — Crystal J Miller

(74) *Attorney, Agent, or Firm* — Donald R. Palladino; Jed C. Benson

(57) ABSTRACT

Disclosed are coated particles. The coated particles include substrate particles and a coating disposed over at least a portion of the substrate particles. The coating includes a condensation reaction product of a reaction mixture that includes a liquid isocyanate-functional component and an isocyanate-reactive composition. Also disclosed are methods for making such particles and methods for using such particles as proppants in hydraulic fracturing.

10 Claims, No Drawings

(56) References Cited

U.S. PATENT DOCUMENTS

| | | |
|---|---|---|
| 6,705,400 B1 | 3/2004 | Nguyen et al. |
| 6,725,931 B2 | 4/2004 | Nguyen et al. |
| 6,729,404 B2 | 5/2004 | Nguyen et al. |
| 6,749,025 B1 | 6/2004 | Brannon et al. |
| 6,772,838 B2 | 8/2004 | Dawson et al. |
| 6,832,650 B2 | 12/2004 | Nguyen et al. |
| 6,866,099 B2 | 3/2005 | Nguyen |
| 6,962,200 B2 | 11/2005 | Nguyen et al. |
| 7,021,379 B2 | 4/2006 | Nguyen |
| 7,036,589 B2 | 5/2006 | Nguyen |
| 7,048,048 B2 | 5/2006 | Nguyen et al. |
| 7,059,406 B2 | 6/2006 | Nguyen |
| 7,066,258 B2 | 6/2006 | Justus et al. |
| 7,073,581 B2 | 7/2006 | Nguyen et al. |
| 7,196,040 B2 | 3/2007 | Heath et al. |
| 7,207,386 B2 | 4/2007 | Brannon et al. |
| 7,216,711 B2 | 5/2007 | Nguyen et al. |
| 7,237,609 B2 | 7/2007 | Nguyen |
| 7,255,169 B2 | 8/2007 | van Batenburg et al. |
| 7,267,170 B2 | 9/2007 | Mang et al. |
| 7,267,171 B2 | 9/2007 | Dusterhoft et al. |
| 7,270,879 B2 | 9/2007 | McCrary |
| 7,273,099 B2 | 9/2007 | East, Jr. et al. |
| 7,281,580 B2 | 10/2007 | Parker et al. |
| 7,281,581 B2 | 10/2007 | Nguyen et al. |
| 7,299,869 B2 | 11/2007 | Kalman |
| 7,306,037 B2 | 12/2007 | Nguyen et al. |
| 7,318,473 B2 | 1/2008 | East, Jr. et al. |
| 7,318,474 B2 | 1/2008 | Welton et al. |
| 7,322,411 B2 | 1/2008 | Brannon et al. |
| 7,325,608 B2 | 2/2008 | van Batenburg et al. |
| 7,334,635 B2 | 2/2008 | Nguyen |
| 7,334,636 B2 | 2/2008 | Nguyen |
| 7,343,973 B2 | 3/2008 | Dusterhoft et al. |
| 7,363,978 B2 | 4/2008 | Welton et al. |
| 7,398,825 B2 | 7/2008 | Nguyen et al. |
| 7,407,010 B2 | 8/2008 | Rickman et al. |
| 7,413,010 B2 | 8/2008 | Blauch et al. |
| 7,426,961 B2 | 9/2008 | Stephenson et al. |
| 7,494,711 B2 | 2/2009 | Kaufman et al. |
| 7,500,519 B2 | 3/2009 | Weaver et al. |
| 7,528,096 B2 | 5/2009 | Brannon et al. |
| 7,571,767 B2 | 8/2009 | Parker et al. |
| 7,581,590 B2 | 9/2009 | Lesko et al. |
| 7,591,313 B2 | 9/2009 | Weaver et al. |
| 7,624,802 B2 | 12/2009 | McCrary et al. |
| 7,665,517 B2 | 2/2010 | Nguyen et al. |
| 7,726,397 B2 | 6/2010 | McDaniel et al. |
| 7,727,940 B2 | 6/2010 | Reddy et al. |
| 7,737,091 B2 | 6/2010 | Windebank et al. |
| 7,772,163 B1 | 8/2010 | Brannon et al. |
| 7,789,147 B2 | 9/2010 | Brannon et al. |
| 7,790,656 B2 | 9/2010 | Windebank et al. |
| 7,803,740 B2 | 9/2010 | Bicerano et al. |
| 7,803,741 B2 | 9/2010 | Bicerano et al. |
| 7,803,742 B2 | 9/2010 | Bicerano et al. |
| 7,819,192 B2 | 10/2010 | Weaver et al. |
| 7,845,409 B2 | 12/2010 | Shinbach et al. |
| 7,883,740 B2 | 2/2011 | Nguyen et al. |
| 7,900,702 B2 | 3/2011 | Reddy et al. |
| 7,902,125 B2 | 3/2011 | Bicerano et al. |
| 7,919,183 B2 | 4/2011 | McDaniel et al. |
| 7,921,911 B2 | 4/2011 | Fuller et al. |
| 7,926,591 B2 | 4/2011 | Nguyen et al. |
| 7,933,718 B2 | 4/2011 | McDaniel et al. |
| 8,066,068 B2 | 11/2011 | Lesko et al. |
| 8,088,718 B2 | 1/2012 | Bicerano et al. |
| 8,129,318 B2 | 3/2012 | McDaniel et al. |
| 8,136,593 B2 | 3/2012 | Weaver et al. |
| 8,136,595 B2 | 3/2012 | Weaver et al. |
| 8,227,026 B2 | 7/2012 | Mcdaniel et al. |
| 8,236,737 B2 | 8/2012 | Fan et al. |
| 8,240,383 B2 | 8/2012 | Xu et al. |
| 8,258,083 B2 | 9/2012 | Bicerano |
| 8,267,176 B2 | 9/2012 | Nguyen et al. |
| 8,268,758 B2 | 9/2012 | Welton et al. |
| 8,276,664 B2 | 10/2012 | Gupta |
| 8,278,373 B2 | 10/2012 | Bicerano et al. |
| 8,317,498 B2 | 11/2012 | Gambier et al. |
| 8,333,241 B2 | 12/2012 | Dusterhoft et al. |
| 8,353,344 B2 | 1/2013 | Carlson et al. |
| 8,360,149 B2 | 1/2013 | Hughes et al. |
| 8,361,934 B2 | 1/2013 | Bicerano |
| 8,366,408 B2 | 2/2013 | Wago et al. |
| 8,392,120 B2 | 3/2013 | McDaniel et al. |
| 8,418,761 B2 | 4/2013 | van Zanten et al. |
| 8,443,885 B2 | 5/2013 | Rickman et al. |
| 8,443,890 B2 | 5/2013 | Hoch et al. |
| 8,490,700 B2 | 7/2013 | Lesko et al. |
| 8,506,262 B2 | 8/2013 | Leugemors et al. |
| 8,517,103 B1 | 8/2013 | Jamison et al. |
| 8,551,924 B2 | 10/2013 | Rickman et al. |
| 8,562,900 B2 | 10/2013 | Alary et al. |
| 8,584,754 B1 | 11/2013 | Nguyen et al. |
| 8,613,320 B2 | 12/2013 | Nguyen et al. |
| 8,614,171 B2 | 12/2013 | Hoch et al. |
| 8,623,792 B2 | 1/2014 | Iverson et al. |
| 8,636,065 B2 | 1/2014 | Lesko et al. |
| 8,653,010 B2 | 2/2014 | Welton et al. |
| 8,720,556 B2 | 5/2014 | Todd |
| 8,757,259 B2 | 6/2014 | Lesko et al. |
| 8,763,699 B2 | 7/2014 | Medvedev et al. |
| 8,763,700 B2 | 7/2014 | McDaniel et al. |
| 8,770,294 B2 | 7/2014 | Tanguay et al. |
| 8,772,205 B2 | 7/2014 | Bismarck et al. |
| 8,828,269 B1 | 9/2014 | Garrett et al. |
| 8,905,135 B2 | 12/2014 | Iverson et al. |
| 8,967,263 B2 | 3/2015 | Ogle et al. |
| 8,969,264 B2 | 3/2015 | Jamison et al. |
| 8,993,489 B2 | 3/2015 | McDaniel et al. |
| 9,004,172 B2 | 4/2015 | Carlson et al. |
| 9,040,467 B2 | 5/2015 | McDaniel et al. |
| 9,085,727 B2 | 7/2015 | Litvinets et al. |
| 9,096,790 B2 | 8/2015 | McCrary et al. |
| 9,120,963 B2 | 9/2015 | Willberg et al. |
| 9,155,310 B2 | 10/2015 | Agrawal et al. |
| 9,161,544 B2 | 10/2015 | Agrawal et al. |
| 9,169,433 B2 | 10/2015 | Nguyen et al. |
| 9,206,345 B2 | 12/2015 | Weaver et al. |
| 9,222,014 B2 | 12/2015 | Rickman et al. |
| 9,243,182 B2 | 1/2016 | Lanctot-Downs et al. |
| 9,243,183 B2 | 1/2016 | Liang et al. |
| 9,243,491 B2 | 1/2016 | McDaniel et al. |
| 9,260,650 B2 | 2/2016 | Nguyen et al. |
| 9,279,077 B2 | 3/2016 | Liang et al. |
| 9,290,690 B2 | 3/2016 | McDaniel et al. |
| 9,297,244 B2 | 3/2016 | Mahoney et al. |
| 9,303,203 B2 | 4/2016 | Drochon et al. |
| 9,303,474 B2 | 4/2016 | Shindgikar et al. |
| 9,315,721 B2 | 4/2016 | Mahoney et al. |
| 9,321,956 B2 | 4/2016 | Nguyen et al. |
| 9,334,338 B2 | 5/2016 | Bismarck et al. |
| 9,359,547 B2 | 6/2016 | Ogle et al. |
| 9,371,479 B2 | 6/2016 | Mirakyan et al. |
| 9,382,469 B2 | 7/2016 | Kuhlmann et al. |
| 9,403,115 B2 | 8/2016 | Majumder et al. |
| 9,410,402 B2 | 8/2016 | Wang et al. |
| 9,429,005 B2 | 8/2016 | Nguyen |
| 9,518,214 B2 | 12/2016 | McCrary et al. |
| 9,683,334 B2 | 6/2017 | Robinson et al. |
| 2002/0070020 A1 | 6/2002 | Nguyen |
| 2003/0232956 A1 | 12/2003 | Brinkman |
| 2005/0194142 A1 | 9/2005 | Nguyen et al. |
| 2005/0263283 A1 | 12/2005 | Nguyen |
| 2006/0035790 A1 | 2/2006 | Okell et al. |
| 2006/0046068 A1* | 3/2006 | Barancyk ........... C08G 18/0885 428/423.1 |
| 2006/0175059 A1 | 8/2006 | Sinclair et al. |
| 2007/0155941 A1 | 7/2007 | Nefzger et al. |
| 2007/0204992 A1 | 9/2007 | Davis et al. |
| 2008/0179057 A1 | 7/2008 | Dawson |
| 2009/0292099 A1 | 11/2009 | Garrett et al. |
| 2010/0263870 A1 | 10/2010 | Willberg et al. |
| 2010/0276142 A1 | 11/2010 | Skildum et al. |

(56) References Cited

U.S. PATENT DOCUMENTS

| | | |
|---|---|---|
| 2010/0282465 A1 | 11/2010 | Weaver et al. |
| 2011/0071056 A1 | 3/2011 | Saini et al. |
| 2011/0120719 A1 | 5/2011 | Soane et al. |
| 2011/0253366 A1 | 10/2011 | Berrigan et al. |
| 2011/0297383 A1 | 12/2011 | Tanguay et al. |
| 2012/0037368 A1 | 2/2012 | Eick et al. |
| 2012/0088699 A1 | 4/2012 | Qin |
| 2012/0329683 A1 | 12/2012 | Droger et al. |
| 2013/0065800 A1 | 3/2013 | McDaniel et al. |
| 2013/0068460 A1 | 3/2013 | Kumar et al. |
| 2013/0072588 A1 | 3/2013 | Rosthauser et al. |
| 2013/0081812 A1 | 4/2013 | Green et al. |
| 2013/0186624 A1 | 7/2013 | McCrary et al. |
| 2013/0292116 A1 | 11/2013 | Nguyen et al. |
| 2013/0292118 A1 | 11/2013 | Nguyen |
| 2014/0076558 A1 | 3/2014 | Nguyen et al. |
| 2014/0076570 A1 | 3/2014 | Nguyen |
| 2014/0110111 A1 | 4/2014 | Tanguay et al. |
| 2014/0113071 A1 | 4/2014 | Schofalvi |
| 2014/0116698 A1 | 5/2014 | Tang et al. |
| 2014/0116711 A1 | 5/2014 | Tang |
| 2014/0144631 A1 | 5/2014 | Weaver et al. |
| 2014/0162911 A1* | 6/2014 | Monastiriotis ......... C09K 8/805 507/221 |
| 2014/0190697 A1 | 7/2014 | Tang |
| 2014/0196898 A1 | 7/2014 | Tanguay et al. |
| 2014/0238673 A1 | 8/2014 | Nguyen et al. |
| 2014/0262247 A1 | 9/2014 | Duenckel et al. |
| 2014/0262262 A1 | 9/2014 | Zheng et al. |
| 2014/0262295 A1 | 9/2014 | Aines et al. |
| 2014/0274819 A1 | 9/2014 | McCrary et al. |
| 2014/0318779 A1 | 10/2014 | Welton et al. |
| 2014/0338906 A1 | 11/2014 | Monastiriotis et al. |
| 2014/0345864 A1 | 11/2014 | Winter et al. |
| 2014/0364538 A1 | 12/2014 | Baney et al. |
| 2015/0034314 A1* | 2/2015 | Hudson ................. C09K 8/805 166/276 |
| 2015/0053403 A1 | 2/2015 | Potapenko et al. |
| 2015/0083414 A1 | 3/2015 | Monroe et al. |
| 2015/0083420 A1 | 3/2015 | Gupta et al. |
| 2015/0107835 A1 | 4/2015 | Panga et al. |
| 2015/0184064 A1 | 7/2015 | Windebank et al. |
| 2015/0203745 A1 | 7/2015 | McDaniel et al. |
| 2015/0252252 A1 | 9/2015 | Soane et al. |
| 2015/0259592 A1 | 9/2015 | McDaniel et al. |
| 2015/0275644 A1 | 10/2015 | Chen et al. |
| 2015/0299559 A1 | 10/2015 | Weiss et al. |
| 2015/0315458 A1 | 11/2015 | Tanguay et al. |
| 2015/0315892 A1 | 11/2015 | McDaniel |
| 2015/0361331 A1 | 12/2015 | Tanguay et al. |
| 2015/0368036 A1 | 12/2015 | Bromley et al. |
| 2015/0369027 A1 | 12/2015 | Jones et al. |
| 2016/0024371 A1 | 1/2016 | Vo et al. |
| 2016/0032178 A1 | 2/2016 | Fitzgerald et al. |
| 2016/0032179 A1 | 2/2016 | Tanguay et al. |
| 2016/0053160 A1 | 2/2016 | Nguyen et al. |
| 2016/0053599 A1 | 2/2016 | Nguyen et al. |
| 2016/0075941 A1 | 3/2016 | Duenckel et al. |
| 2016/0090509 A1 | 3/2016 | Sworen et al. |
| 2016/0108713 A1 | 4/2016 | Dunaeva et al. |
| 2016/0122618 A1 | 5/2016 | Nguyen et al. |
| 2016/0137904 A1 | 5/2016 | Drake et al. |
| 2016/0137907 A1 | 5/2016 | Vo et al. |
| 2016/0145486 A1 | 5/2016 | Weaver et al. |
| 2016/0153273 A1 | 6/2016 | Nguyen et al. |
| 2016/0177162 A1 | 6/2016 | Nguyen et al. |
| 2016/0186049 A1 | 6/2016 | Bothwell et al. |
| 2016/0186050 A1 | 6/2016 | Lehman et al. |
| 2016/0200960 A1 | 7/2016 | Nguyen et al. |
| 2016/0201442 A1 | 7/2016 | Gullickson et al. |
| 2016/0201443 A1 | 7/2016 | Nguyen et al. |
| 2016/0208157 A1 | 7/2016 | Vo et al. |
| 2016/0208161 A1 | 7/2016 | Nguyen et al. |
| 2016/0230543 A1 | 8/2016 | Borrell et al. |
| 2016/0257876 A1 | 9/2016 | Zielinski et al. |
| 2016/0281498 A1 | 9/2016 | Nguyen et al. |
| 2016/0333259 A1 | 11/2016 | Monastiriotis et al. |
| 2016/0333535 A1* | 11/2016 | Robinson ............. C08G 18/667 |
| 2016/0340574 A1 | 11/2016 | Vo et al. |
| 2016/0340575 A1 | 11/2016 | Nguyen et al. |
| 2016/0347985 A1 | 12/2016 | Li et al. |
| 2016/0347991 A1 | 12/2016 | Wheeler |

FOREIGN PATENT DOCUMENTS

| | | |
|---|---|---|
| WO | 16160425 A1 | 10/2016 |
| WO | 16191633 A1 | 12/2016 |

OTHER PUBLICATIONS

Zielinski et al.; U.S. Appl. No. 62/416,342; "Reducing Erosion of Oil Field Pumping and Transfer Equipment"; filed Nov. 2, 2016; Covestro LLC, Pittsburgh, PA.

Zielinski et al.; U.S. Appl. No. 62/545,601; "Additive to Flexibilize Epoxy-Based Resins for Use in Oil Field Applications"; filed Aug. 15, 2017; Covestro LLC, Pittsburgh, PA.

Thompson-Colon et al; U.S. Appl. No. 62/418,427; "Time Released Delivery of Functional Chemicals"; filed Nov. 7, 2016; Covestro LLC, Pittsburgh, PA.

* cited by examiner ial should not be detrimentally effected as compared to those produced from petroleum-based materials. In addition, retailers and government agencies are pushing for higher renewable resource content in the finished goods they sell or purchase to take advantage of this "green" image or to reduce the dependence on petroleum-based materials.

COATED PARTICLES, METHODS FOR THEIR MANUFACTURE AND FOR THEIR USE AS PROPPANTS

CROSS-REFERENCE TO RELATED APPLICATION

The present application is a divisional application of U.S. application Ser. No. 15/682,595, filed Aug. 22, 2017, the disclosure of which is incorporated herein by reference.

FIELD

The present specification relates to coated particles, methods for their preparation and methods of using such particles as proppants in hydraulic fracturing.

BACKGROUND

Hydraulic fracturing is a process in which an underground geologic formation that is disposed adjacent to a bore hole is fractured by injecting a pressurized material in order to extract a desired substance, such as oil and/or a gas (such as natural gas), from the geologic formation. The injection of the pressurized material creates channels, i.e., fractures, in the geologic formation through which the desired substance may flow to the bore hole and be retrieved. In this process, the material injected into the geologic formation is often a liquid carrying solid particles that are often referred to as a proppant. Proppants are often particles, such as sand, that have a coating disposed on the particle. The proppant migrates into the fractures that are formed and holds them open so that the desired material can flow out of the fracture.

One problem for many existing proppants, particularly those used in low temperature (no more than 150° F.) wells, is that of inadequate crush resistance. Crush resistance refers to the ability of a proppant to resist breaking down at high pressure. A proppant with poor crush resistance would fail to effectively prop open fractures in the geologic formation and can contribute to the inclusion of dust particles in extracted fuel substance. Yet another problem, even with proppants that initially exhibit good crush resistance, is their inability to maintain such good crush resistance over time. In other words, they exhibit poor shelf-life stability.

In addition, materials derived from renewable resources are becoming more commercially desirable due partly to the increasing cost of petroleum-derived feedstocks. The "green" image of renewable-based products has also become a significant factor in the marketing of various products; however, the physical characteristics and properties of, for example, any coated proppants produced using such materials should not be detrimentally effected as compared to those produced from petroleum-based materials. In addition, retailers and government agencies are pushing for higher renewable resource content in the finished goods they sell or purchase to take advantage of this "green" image or to reduce the dependence on petroleum-based materials.

As a result, it would be desirable to provide improved coated particles that can be used, for example, as a proppant in hydraulic fracturing in which the proppant has good crush resistance as measured by unconfined compressive strength ("UCS") and also has the ability to retain its UCS over a significant period of time, i.e., it has extended shelf life stability. Moreover, it would be further desirable to provide such particles in which the coating is derived from a significant amount of biobased/renewable material.

The inventions described in this specification were made in view of the foregoing.

SUMMARY OF THE INVENTION

In certain respects, the present specification is directed to coated particles comprising: (a) substrate particles having a particle size of no more than 3 mesh; and (b) a coating disposed over at least a portion of the particles, wherein the coating comprises a condensation reaction product of a reaction mixture comprising: (i) a methylene diphenyl diisocyanate mixture comprising at least 10 percent by weight of 2,4'-methylene diphenyl diisocyanate and/or 2,2'-methylene diphenyl diisocyanate, based on the total weight of the mixture; and (ii) an isocyanate-reactive composition comprising: (A) a plant oil polyester polyol; (B) an aromatic diamine; and (C) a catalyst for the reaction between hydroxyl groups and isocyanate groups.

In other respect, the present specification is directed to coated particles comprising: (a) substrate particles having a particle size of no more than 3 mesh; and (b) a coating disposed over at least a portion of the particles, wherein the coating comprises (1) a condensation reaction product of a reaction mixture comprising: (i) a liquid isocyanate-functional component; and (ii) an isocyanate-reactive composition comprising: (A) a polyol, such as a plant oil polyester polyol, as described above; (B) an aromatic diamine; (C) a catalyst for the reaction between hydroxyl groups and isocyanate groups; and (2) a crystalline or semicrystalline polyester/polyurethane having a decrystallization temperature of at least 35° C.

The present specification also relates to, for example, methods for making such coated particles and methods for using such coated particles, such as in hydraulic fracturing a geologic formation.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the present specification are directed to coated particles. As used herein, the terms "particle" and "particulate" may be used interchangeably and, in each case, refers to discrete three dimensionally shaped objects. The particles suitable for use herein can have any of a variety of shapes, including, for example, generally spherical or elongated. In certain embodiments, the particles have an aspect ratio of from 1:1 (a perfect sphere) up to 1:100, up to 1:50, up to 1:20, or, in some cases, up to 1:10 or up to 1:5. As used herein, the "aspect ratio" of a particle is the ratio of the length of the shortest dimension of the particle to the length of the longest dimension of the particle.

The coated particles of the present specification comprise a substrate particle. The substrate particle can be made of any of a variety of materials including, for example, organic and inorganic materials. In certain embodiments, the substrate particle comprises a material that renders the coated particles suitable for use as a proppant in hydraulic fracturing of a geologic formation. As used herein, the term "proppant" refers to particles that are injected into fractures of an underground geologic formation, such as those that may surround a bore hole, such as a bore hole connected with an oil well, water well, gas well, and the like, to support the fracture in an open position in order to allow a desired material, such as oil, water, natural gas, or other material, to flow through the fracture to the bore hole for retrieval.

In some embodiments, the substrate particle has a particle size of no more than 3 mesh (6730 µm), no more than 6 mesh (3360 µm), no more than 10 mesh (2000 µm), no more than 20 mesh (841 µm), no more than 40 mesh (400 µm), or, in some cases, no more than 50 mesh (297 µm), no more than 60 mesh (250 µm), no more than 70 mesh (210 µm), no more than 80 mesh (177 µm), no more than 100 mesh (149 µm), no more than 200 mesh (74 µm), or, in some cases, no more than 400 mesh (37 µm). In some embodiments wherein the substrate particle comprises sand, for example, the particle size is no more than 40 mesh (400 µm), or, in some cases, no more than 50 mesh (297 µm) or no more than 60 mesh (250 µm). As used herein, "mesh" refers to USA Standard Testing screen numbers. As used herein, "particle size" refers to the largest dimension of a discrete individual particle (as opposed to an agglomeration of individual particles).

As indicated, the substrate particle may comprise any of a variety of materials, including organic and inorganic materials. In certain embodiments, the substrate particle comprises an inorganic material, such as a clay, graphite, glass, cenosphere, slag, sand, mineral fiber, and/or ceramic. In certain embodiments, the substrate particle comprises an organic material, such as an organic polymer and/or a naturally occurring organic material.

The particles described in this specification may be free-flowing particles. As used herein, "free-flowing particle" refers to a dried particle that is not an aggregate of particles stuck or adhered to each other so as to form clumps. In some embodiments, "free-flowing particles" of the present specification have an angle of repose that is less than, for example, 60° degrees when the particles are passed through a 10 mesh (2000 µm) sieve. Moreover, in some embodiments, the free-flowing particles of the present specification are such that at least 85% by weight, such as at least 90% by weight, or, in some cases, at least 95% by weight, of the particles are pourable after 1 week at 140° F./95% relative humidity.

Certain embodiments of the present specification are directed to coated particles comprising a coating disposed over at least a portion of the particle. In certain embodiments, the coating is a substantially continuous film that covers all or substantially all the surface of the substrate particle. As used herein, "substantially all" means that the coating covers at least 90 percent of the surface of the substrate particle. As will be appreciated, the coated particles of the present specification are distinct from situations in which particles are simply dispersed in a polymer matrix or binder.

Certain embodiments of the particles of the present specification comprise a coating that comprises a condensation reaction product of a reaction mixture comprising: (i) a liquid isocyanate-functional component; and (ii) an isocyanate-reactive composition.

For example, in some embodiments of the particles of the present specification, the liquid isocyanate-functional component comprises a methylene diphenyl diisocyanate mixture. As used herein, the term "methylene diphenyl diisocyanate mixture" refers to a mixture of various isomers of methylene diphenyl diisocyanate monomer ("MDI"), such as mixtures of at least two of 2,2'-MDI, 2,4'-MDI, and 4,4'-MDI, which may be present in combination with other isocyanate-functional components, such as polymeric methylene diphenyl diisocyanate ("p-MDI").

More specifically, in certain embodiments of the particles of the present specification, the methylene diphenyl diisocyanate mixture comprises a relatively high amount of 2,2'-MDI and/or 2,4'-MDI, in some cases a relatively high amount of 2,4'-MDI. Even more specifically, in certain embodiments, such methylene diphenyl diisocyanate mixtures comprise at least 10 percent by weight, such as at least 15 percent by weight, of 2,4'-MDI and/or 2,2'-MDI, in some cases 2,4'-MDI, based on the total weight of the mixture. In some embodiments, such methylene diisocyanate mixtures comprise at least 25 percent by weight of 2,4'-MDI and/or 2,2'-MDI, in some cases 2,4'-MDI, based on the total weight of MDI in the mixture. In fact, it was discovered, unexpectedly, that the use of such methylene diphenyl diisocyanate mixtures comprising a relatively high amount of 2,2'-MDI and/or 2,4'-MDI, particularly 2,4'-MDI, could provide proppant particles of the present specification that exhibit very high (more than 75%, in some cases, 90% or more) % UCS retention when measured as described in the Examples.

Such methylene diphenyl diisocyanate mixtures having a relatively high amount of 2,2'-MDI and/or 2,4'-MDI are commercially available, and include, for example, Mondur® MRS-2, Mondur® MRS-4, Mondur® MRS-5, and Mondur® ML, from Covestro LLC.

In some embodiments of the particles of the present specification, the liquid isocyanate-functional component comprises a urethane-modified diphenylmethane diisocyanate prepolymer that is prepared by reacting an excess of a polymethylene poly(phenyl isocyanate) with an isocyanate-reactive component to form the isocyanate-terminated prepolymer. Suitable isocyanate-reactive components for use in preparing the liquid urethane-modified diphenylmethane diisocyanate prepolymer include polyether polyol and polyester polyols, for example.

In some embodiments, for example, the isocyanate-reactive component used to produce the liquid urethane-modified isocyanate-terminated prepolymer comprises a polyester polyol. In these embodiments, the isocyanate-terminated prepolymer is produced by reacting a polymeric diphenylmethane diisocyanate having, for example, an isocyanate content of from 29 to 33.5%, such as 31 to about 32.5% and/or a viscosity at 25° C. of 50 to 1,000 mPa·s, such as 100 to about 350 mPa·s or 150 to 220 mPa·s with a polyester polyol or a blend of polyols that comprises a polyester polyol. In some embodiments, the polymeric diphenylmethane diisocyanate employed includes 38 to 50% by weight (based on total weight of isocyanate) of monomeric diphenylmethane diisocyanate, such as 42 to 48% by weight of monomeric diphenylmethane diisocyanate, with the remainder of the polymeric diphenylmethane diisocyanate being made up of the higher oligomers of diphenylmethane diisocyanate.

Various commercially available polymeric diphenylmethane diisocyanates may be used. Examples of suitable polymeric diphenylmethane diisocyanates which are commercially available include those sold under the names Mondur® MR and Mondur® MR Light by Covestro LLC.

In these embodiments, the polymeric diphenyl-methane diisocyanate is reacted with a polyol, such as a polyester polyol, or a polyol blend comprising a polyester polyol having a functionality of from 1.8 to 4, such as 1.8 to 2.4 or 1.9 to 2.2. Such polyols or polyol blends often have a number average molecular weight (as determined by end group analysis) of from 400 to 2,000, such as 400 to 800 or 450 to 500.

Suitable polyester polyols for preparing liquid urethane-modified diphenylmethane diisocyanate prepolymers suitable for use herein include the reaction products of polyhydric alcohols (preferably dihydric alcohols to which trihydric alcohols may be added) with polybasic (preferably dibasic) carboxylic acids, the corresponding carboxylic acid anhydrides and polycarboxylic acid esters of lower alcohols or mixtures thereof. The polycarboxylic acids may be aliphatic, cycloaliphatic, aromatic and/or heterocyclic and they may be substituted, e.g., by halogen atoms, and/or unsaturated.

Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid an hydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate.

Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis-(hydroxy-methyl)cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane.

The polyesters may also contain a portion of carboxyl end groups. Polyesters of lactones, e.g., ε-caprolactone or hydroxyl carboxylic acids such as w-hydroxycaproic acid, may also be used.

In some embodiments, the polyester polyol is formed from ethylene glycol and/or diethylene glycol and phthalic acid anhydride, dimethylterephthalate or phthalic acid.

Polyester polyols and polyester polyol blends of the type disclosed in U.S. Pat. No. 4,644,027 in which a hydrophobic compound is incorporated into the polyester polyol are suitable.

As indicated, the liquid urethane-modified diphenylmethane diisocyanate prepolymers can be made by reacting the polymeric diphenylmethane diisocyanate with the polyester polyol in amounts such that the equivalent ratio of isocyanate groups in the polymeric diphenylmethane diisocyanate to hydroxyl groups in the polyester polyol is from, for example, 15:1 to 160:1, such as 25:1 to 39:1. This reaction is often carried out at temperatures of from about 40 to about 80° C., such as 50 to 60° C. for periods of, for example, from 10 to 60 minutes, such as 20 to 40 minutes.

In some embodiments, such liquid urethane-modified diphenylmethane diisocyanate prepolymers have an NCO functionality of at least 2.1, such as at least 2.3 or at least 2.5 and less than or equal to 3.8, such as less than or equal to 3.5 or less than or equal to 3.2. Such liquid urethane-modified diphenylmethane diisocyanate prepolymers may have an NCO functionality ranging between any combination of these upper and lower values, inclusive, e.g. from 2.1 to 3.8, such as from 2.3 to 3.5 or from 2.5 to 3.2.

In some embodiments, such liquid urethane-modified diphenylmethane diisocyanate prepolymers have an NCO group content of at least 25% by weight, such as at least 27.5% by weight or at least 29% by weight and an NCO group content of less than or equal to 33% by weight, such as less than or equal to 32% by weight or less than or equal to 31% by weight. Such liquid urethane-modified diphenylmethane diisocyanate prepolymers may have an NCO group content ranging between any combination of these upper and lower values, inclusive, e.g., from 25% to 33% by weight, from 27.5% to 32% by weight or from 29% to 31% by weight.

In some embodiments, such liquid urethane-modified diphenylmethane diisocyanate prepolymers have an NCO group content of from 27.5% to 32%, such as 29.8 to 31.2%, and a functionality of from 2.3 to 3.5, such as 2.8, and a viscosity of 200 to 1000 mPa·s at 25° C., such as 235 to 435 mPa·s at 25° C.

In other embodiments, the isocyanate-reactive component used to produce the liquid urethane-modified isocyanate-terminated prepolymer comprises a branched aliphatic dihydroxy compound. For example, in some embodiments, the liquid urethane-modified isocyanate-terminated prepolymer comprises the reaction product of 0.1 to 0.3 mols of an aliphatic dihydroxy compound having a branched carbon chain with 1 mol of 4,4'-diphenylamine diisocyanate and/or the 2,4'-isomer thereof.

Suitable branched aliphatic dihydroxy compounds for preparing such liquid urethane-modified isocyanate-terminated prepolymers include, for example, 1,3-propanediols which contain at least two alkyl groups in the molecule, such as 2-ethylhexyldiol-(1,3), 2-methyl pentanediol-(2,4), 2,2,4-trimethylpentanediol-(1,3), 3-methyl-5-ethylheptane diol-(2,4), 2-methyl-2-propylpropane diol-(1,3), or mixtures of any two or more thereof. In certain embodiments, poly-1,2 propylene ether glycols of molecular weight 134 to 700, such as dipropylene glycol, tripropylene glycol, a polypropylene glycol, or mixtures of any two or more thereof, are used.

Such liquid urethane-modified isocyanate-terminated prepolymers can be prepared by introducing the branched aliphatic glycols into the diisocyanate at a temperature of 40 to 600° C. with stirring, the addition reaction being completed at temperatures of up to 800° C.

In certain embodiments, the isocyanate content of such liquid urethane-modified isocyanate-terminated prepolymers the products of the process amounts to 15% NCO to 25% NCO. The difference between the isocyanate content of the pure crystalline diphenylmethane diisocyanate and that of the products of the process corresponds to the amount of branched dihydroxyl compounds employed.

In some embodiments, such liquid urethane-modified diphenylmethane diisocyanate prepolymers have an NCO group content of at least 15% by weight, such as at least 20% by weight or at least 22% by weight and an NCO group content of less than or equal to 25% by weight, such as less than or equal to 24% by weight or less than or equal to 23% by weight. Such liquid urethane-modified diphenylmethane diisocyanate prepolymers may have an NCO group content ranging between any combination of these upper and lower values, inclusive, e.g., from 15% to 25% by weight, from 20% to 24% by weight or from 22% to 24% by weight.

In some embodiments, such liquid urethane-modified diphenylmethane diisocyanate prepolymers have a viscosity of 300 to 1000 mPa·s at 25° C., such as 500 to 1000 mPa·s at 25° C., or 550 to 800 mPa·s at 25° C. at 25° C.

As indicated, certain embodiments of the particles of the present specification comprise a coating that comprises a condensation reaction product of a reaction mixture comprising an isocyanate-reactive composition. As used herein, the term "isocyanate-reactive composition" refers to a composition that includes components with functional groups reactive towards isocyanate groups ("isocyanate-functional component(s)"), such as hydroxyl groups, amine groups, and thiol groups.

In certain embodiments, the isocyanate reactive composition comprises a plant oil polyester polyol. As used herein, the term "plant oil polyester polyol" refers to an ester polyol produced by introducing active hydrogen groups onto a plant oil. As will be appreciated, plant oils are triglycerides of mixtures of fatty acids, often containing some unsaturated fatty acids.

Plant oil polyester polyols suitable for use herein can be produced by any of a variety of methods. For example, in certain embodiments, a two-step process is used that begins with the epoxidation of plant oil followed by introduction of hydroxyl groups onto the plant oil molecule by opening the oxirane of epoxidized plant oil. This opening of the oxirane ring can be accomplished in a variety of ways, such as for example, with ricinoleic acid, as described in U.S. Pat. No. 2,882,249, with acrylic acid, as described in U.S. Pat. No. 4,025,477, with carboxylic acids, as described in U.S. Pat. Nos. 5,266,714 and 5,302,626, with acid leached clay, as described in U.S. Pat. No. 6,891,053, with (poly)alcohols, as described in U.S. Pat. Nos. 4,508,853, 4,742,087, 6,433,125, 4,551,517 and 4,886,893, or with a mixture of water, alcohol and fluoroboric acid, as described in U.S. Pat. Nos. 6,107,433, 6,433,121, 6,573,354 and 6,686,435.

In another technique, as described in U.S. Patent Application Publication No. 2009/0292099 A1 at [0015]-[0028], the cited portion of which being incorporated herein by reference, the unsaturated sites in a plant oil are directly functionalized to yield a plant oil polyester polyol in a one-step process by reacting a reactant with at least one nucleophilic functional group (such as amines, thiols and phosphines) and at least one active hydrogen group with a plant oil having at one carbon-carbon double bond.

Suitable plant oils for use in preparing such plant oil polyester polyols include, for example, corn oil, soybean oil, rapeseed oil, sunflower oil, sesame seed oil, peanut oil, safflower oil, olive oil, cotton seed oil, linseed oil, walnut oil and tung oil and mixtures thereof. As will be appreciated, soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule.

In certain embodiments, the plant oil polyester polyol has a viscosity at 25° C. of less than 1000 mPa·s, such as 100 to 1000 mPa·s cps or 200 to 500 mPa·s, an OH number of 175 to 550, such as 175 to 340, or 200 to 260, and/or a functionality of from 2 to 5, such as 2 to 4, 2 to 3, or 2.

In certain embodiments, the plant oil polyester polyol, as described above, is present in an amount of at least 50% by weight, such as at least 60% by weight, such as 50% to 90% by weight, or 60% to 80% by weight, based on the total weight of isocyanate-reactive components present in the isocyanate-reactive composition.

As previously indicated, in certain embodiments, the isocyanate-reactive composition also comprises an aromatic diamine, such as those which contain at least one alkyl substituent in the ortho-position to a first amino group and two alkyl substituents in the ortho-position to a second amino group or mixtures thereof. In some embodiments, at least two of said alkyl substituents contain at least two carbon atoms. In certain embodiments, the reactivity of said diamine towards isocyanates has not been reduced by electron attracting substituents, such as halogen, ester, ether or disulphide groups, as is the case, for example, with methylene-bis-chloroaniline (MOCA). In certain embodiments, such diamines do not contain other functional groups reactive with isocyanates. In certain embodiments, the foregoing mentioned alkyl substituent can have as many as twenty carbon atoms and can be straight or branched long chains.

In certain embodiments, the aromatic diamine contains at least one alkyl substituent in the ortho-position to a first amino group and two alkyl substituents having from 1 to 3 carbon atoms in the ortho-position to a second amino group, provided that two of these alkyl substituents contain two or three carbon atoms. Examples of such aromatic diamines include: 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

The above-mentioned aromatic amines may, of course, be used as mixtures with each other or in combination with other active aromatic amines.

In certain embodiments, aromatic diamines which have a linear alkyl substituent having from 1 to 3 carbon atoms in both ortho-positions to each amino group, provided that two of the alkyl substituents contain two or three carbon atoms, are used. In some embodiments, the diamine is liquid at room temperature and miscible with polyols, particularly with polyether polyols. An example of such a compound is 1-methyl-3,5-diethyl-2,4-diaminobenzene or a mixture of this compound with 1-methyl-3,5-diethyl-2,6-diaminobenzene.

In certain embodiments, the aromatic amine is present in an amount of 5 to 50% by weight, such as 10 to 40% by weight, or, in some cases, 25 to 35% by weight, based on the total weight of the total weight of isocyanate-reactive components present in the isocyanate-reactive composition.

As indicated, the isocyanate-reactive composition may comprise a catalyst for the reaction between hydroxyl groups and isocyanate groups. Suitable catalysts include, for example, organic tin compounds such as tin (II) salts of carboxylic acids (such as tin (II) acetate, tin (II) octoate, tin (II) ethyl hexoate or tin (II) laurate), and the dialkyl tin salts of carboxylic acids (such as dibutyl tin diacetate, dibutyl tin dilaurate, dibutyl tin maleate or dioctyl tin diacetate) either alone or as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines.

Other catalysts which may be used include tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylamino-ethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

Tertiary amines having isocyanate-reactive hydrogen atoms include, for example, triethanolamine, triisopropanolamine, N-methyl-diethanolamine, N-ethyl-diethanolamine, and N,N-dimethyl-ethanolamine may also be used. Reaction products of these compounds with alkylene oxides, such as propylene oxide and/or ethylene oxide are also suitable.

Silaamines having carbon-silicon bonds as described, e.g. in German Pat. No. 1,229,290 may also be used as catalysts. Examples include 2,2,4-trimethyl-2-silamorpholine or 1,3-diethylaminomethyl-tetramethyl-disiloxane.

Basic nitrogen compounds, such as tetraalkylammonium hydroxides, alkali metal hydroxides such as sodium hydroxide, alkali metal phenolates, such as sodium phenolate, and alkali metal alcoholates, such as sodium methylate, may also be used as catalysts. Hexahydrotriazines are also suitable catalysts.

In certain embodiments, the catalyst comprises (i) an organic tin compound, such as a dialkyl tin salt of carboxylic acid, such as dibutyl tin dilaurate, and (ii) a tertiary amine, such as 1,4-diaza-bicyclo-(2,2,2)-octane. In certain embodiments, the relative weight ratio of (i) to (ii) is 20:80 to 80:20, such as 40:60 to 60:40.

In certain embodiments, the catalyst is present in an amount of from 0.01 to 10% by weight, such as 0.05 to 1% by weight, based on the total weight of isocyanate-reactive components in the isocyanate-reactive composition.

The catalysts to be used should accelerate the polyaddition reaction to such an extent that once the starting components have been mixed the reaction mixture has a flow time (e.g., the capability to flow and hence the time during which the mixture may still be delivered) of less than 15, 10, or 5 seconds.

In certain embodiments, the liquid isocyanate-functional component and the isocyanate-reactive composition are each used in amounts such that the reaction mixture has an NCO Index (i.e., the ratio of the total number of reactive isocyanate groups present to the total number of isocyanate-reactive groups that can react with the isocyanate multiplied by 100) of at least 120, such at least 140, or at least 180 and no more than 500, such as no more than 400 or, in some cases, no more than 300 or no more than 250. The NCO Index can range between any combination of these upper and lower values, inclusive, e.g., from 120 to 500, 140 to 500, 180 to 400, 180 to 300, or 180 to 250, for example.

Other ingredients may be used to form the coated particles of this specification. For example, in certain embodiments, use is made of an aminosilane coupling agent having the formula:

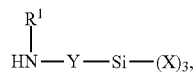

in which: (A) each X, which may be the same or different, is an organic group that is inert to isocyanate groups below 100° C., provided that at least one of these groups are alkoxy or acyloxy groups, such as where each X is an alkyl or alkoxy group having 1 to 4 carbon atoms, such as where each X is an alkoxy group having 2 carbon atoms; (B) Y is a linear or branched alkylene group containing 1 to 8 carbon atoms, such as a linear group containing 2 to 4 carbon atoms or a branched group containing 5 to 6 carbon atoms, such as a linear group containing 3 carbon atoms; and (C) $R^1$ is hydrogen or an organic group which is inert to isocyanate groups at a temperature of 100° C. or less, such as an alkyl, cycloalkyl, or aromatic group having 1 to 12 carbon atoms, or $R^1$ represents a group corresponding to the formula:

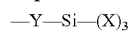

in which X and Y have the same meanings described above.

In certain embodiments, each X represents a methoxy, ethoxy, or propoxy group, and Y is a linear alkylene group containing 3 carbon atoms (i.e., a propylene group) and $R^1$ is hydrogen.

In certain embodiments, the aminosilane is used in an amount of 0.1 to 10% by weight, such as 1 to 5% by weight, or, in some cases, 2 to 4% by weight, based on the total weight of the isocyanate-reactive composition.

Surface-active additives may also be used. Examples include the sodium salts of ricinoleic sulphonates or of fatty acids, or salts of fatty acids with amines, such as oleic acid diethylamine or stearic acid diethanolamine, alkali metal or ammonium salts of sulphonic acids, such as dodecylbenzene sulphonic acid or dinaphthylmethane disulphonic acid, or of fatty acids, such as ricinoleic acid, or of polymeric fatty acids, and water-soluble polyether siloxanes that have a polydimethylsiloxane group attached to a copolymer of ethylene oxide and propylene oxide.

Pigments, dyes, flame retarding agents, stabilizers against ageing and weathering, plasticizers, fungistatic and bacteriostatic substances and fillers may also be used.

In certain embodiments, the coated particles of the present specification comprise a coating that comprises a crystalline or semicrystalline polyester/polyurethane having a decrystallization temperature of at least 35° C.

In fact, it was surprisingly discovered that the % UCS retention (measured as described in the Examples) of coated particle proppants of the present specification could be dramatically improved by inclusion of just a small amount (as described below) of such crystalline or semicrystalline polyester/polyurethane in the coating. As a result, some embodiments of the coated particles of the present specification comprise: (a) a substrate particle having a particle size of no more than 3 mesh; and (b) a coating disposed over at least a portion of the particle, wherein the coating comprises (1) a condensation reaction product of a reaction mixture comprising: (i) a liquid isocyanate-functional component, such as any of those described above; and (ii) an isocyanate-reactive composition comprising: (A) a polyol, such as polyether polyols and/or polyester polyols, such as the plant oil polyester polyol described above; (B) an aromatic diamine; (C) a catalyst for the reaction between hydroxyl groups and isocyanate groups; and (2) a crystalline or semicrystalline polyester/polyurethane having a decrystallization temperature of at least 35° C.

As used herein, the term "crystalline or semicrystalline" means that a polyester/polyurethane has a degree of crystallization of 5 to 100%, such as 20 to 100%. As used herein, "crystalline" means that, in the DSC of a polymer, with rising temperature, a maximum is passed through, which is caused by the melting of regular substructures in the polymer. The temperature at which this maximum occurs is referred to herein as the "decrystallization temperature". In the case of passage through a melting-crystallization cycle, the melting enthalpy can be determined from the area of the melting of crystallization peak. In certain embodiments, the polyester/polyurethanes used herein have a melting enthalpy of at least 5 J/g, such as at least 20 J/g, or, in some cases, at least 40 J/g.

As used herein, the term "polyester/polyurethane" refers to polymers that contain a plurality of ester linkages and a plurality of urethane groups in the polymer backbone. As used herein, "polyurethane" also encompasses polyurethane ureas that, in addition to urethane groups, also contain urea groups.

In certain embodiments, the crystalline or semicrystalline polyester/polyurethane has a decrystallization temperature of at least 35° C., such as at least 40° C., at least 42° C., or, in some cases, at least 45° C. and/or no more than 100° C., no more than 60° C., or, in some cases, no more than 52° C.

In certain embodiments, the crystalline or semicrystalline polyester/polyurethane has a glass transition temperature of at least −100° C., such as at least −60° C. and/or no more than −10° C., such as no more than −40° C., when measured by DSC in accordance with DIN 65467 with a heating up rate of 10 K/min.

In certain embodiments, the crystalline or semicrystalline polyester/polyurethane has a weight-average molecular weight (Mw) of at least 20,000 g/mole, such as at least 30,000 g/mole or, in some cases, at least 50,000 g/mole and/or no more than 250,000 g/mole, such as no more than 220,000 g/mole, or, in some cases, no more than 200,000 g/mole. As used herein, the molecular weight of a polymer is determined by means of gel permeation chromatography (GPC/SEC) with dimethylacetamide as the mobile phase.

In certain embodiments, the crystalline or semicrystalline polyester/polyurethane comprises a reaction product of a reaction mixture comprising: (a) a di- or poly-functional polymeric polyol with a number average molecular weight of from 400 to 5,000 g/mole and comprising a polyester polyol; and (b) a di- or poly-functional isocyanate component. Furthermore, the polyester/polyurethane may, in some embodiments, be present, i.e., solubilized or dispersed, in an organic solvent-based composition or an aqueous composition when deposited onto the substrate particle. As used herein, the term "aqueous composition" refers to a composition in which the carrier fluid for the polyester/polyurethane comprises predominantly water, although the presence of some volatile organic compounds is not excluded. In certain embodiments of the aqueous composition, water is present in an amount of at least 80% by weight, such as at least 90% by weight, at least 95% by weight, or, in some cases, at least 98% by weight or at least 99% by weight, based on the total weight of the carrier fluid. As used herein, the term "organic solvent-based composition" refers to a composition in which the carrier fluid for the polyester/polyurethane comprises predominantly a volatile organic compound, although the presence of some water is not excluded. In certain embodiments of the organic solvent-based composition, volatile organic compound is present in an amount of at least 80% by weight, such as at least 90% by weight, at least 95% by weight, or, in some cases, at least 98% by weight or at least 99% by weight, based on the total weight of the carrier fluid.

In certain embodiments, the proportions of the individual components are selected so that the composition comprising the crystalline or semicrystalline polyester/polyurethane that is deposited onto the substrate particle has a polymer content of 30 to 60 percent by weight, based on the total weight of the composition. In some of these embodiments, the composition that is deposited onto the substrate particle also has a viscosity at 25° C. of 20 to 2,000 cps, such as 40 to 1,000 cps, or, in some cases, 50 to 600 cps.

As indicated, the crystalline or semicrystalline polyester/polyurethane of certain embodiments comprises a reaction product of reactants comprising (a) a di- or poly-functional polymeric polyol with a number average molecular weight of from 400 to 6,000 g/mole, such as 400 to 5,000 g/mole, 800 to 3,000 g/mole, or, in some cases, 800 to 2,500 g/mole or 1,500 to 2,500 g/mole and comprising a polyester polyol. As used herein, "poly-functional" means a component that includes three or more of the functional groups being discussed per molecule, such as, in the case of a polyol, a component comprising at least three hydroxyl groups in the molecule, such as three or four hydroxyl groups in the molecule and, in the case of an isocyanate, a component comprising at least three isocyanate groups in the molecule, such as three or four isocyanate groups in the molecule. In some cases, the di- or poly-functional polymeric polyol with a number average molecular weight of from 400 to 6,000 g/mole has a hydroxyl equivalent weight of 200 to 3,000 g/mole, such as 400 to 1,500 g/mole, or, in some cases, 400 to 1,250 g/mole or 750 to 1,250 g/mole.

Polyester polyols suitable for use in such component (a) include, for example, linear polyester diols and branched polyester polyols. Suitable polyester diols and polyols include those that can be prepared from aliphatic, cycloaliphatic and/or aromatic di- or polycarboxylic acids, such as succinic acid, methylsuccinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid, cyclohexanedicarboxylic acid, maleic acid, fumaric acid, malonic acid, and/or trimellitic acid, and acid anhydrides, such as o-phthalic anhydride, trimellitic anhydride, and/or succinic anhydride, with polyhydric alcohols, such as ethanediol, di-, tri-, or tetra-ethylene glycol, 1,2-propanediol, di-, tri-, or tetra-propylene glycol, 1,3-propanediol, butanediol-1,4, butanediol-1,3, butanediol-2,3, pentanediol-1,5, hexanediol-1,6, 2,2-dimethyl-1,3-propanediol (neopentyl glycol), 1,4-dihydroxycyclohexane, 1,4-dimethylolcyclohexane, octanediol-1,8, decanediol-1,10, and/or dodecanediol-1,12, optionally with additional use of higher-functionality polyols, such as trimethylolpropane, glycerol and/or pentaerythritol. Useful polyhydric alcohols for preparing the polyester diols and polyols also include cycloaliphatic and/or aromatic di- and polyhydroxyl compounds.

Suitable polyester polyols may also be homo- or copolymers of lactones, which are obtained, for example, by addition of lactones or lactone mixtures, such as butyrolactone, ε-caprolactone, and/or methyl-ε-caprolactone, onto the suitable difunctional and/or higher-functionality starter molecules, for example the low molecular weight polyhydric alcohols mentioned above.

In certain embodiments, the di- or poly-functional polyester-polyol comprises a reaction product of reactants comprising adipic acid and one or more of butanediol-1,4, hexanediol-1,6, and neopentyl glycol.

In certain embodiments, the di- or poly-functional polyester polyol comprises a reaction product of reactants comprising a dicarboxylic acid comprising succinic acid, adipic acid, dodecandoic acid, derivatives thereof, and/or mixtures thereof, employed in an amount of at least 80 mole %, at least 85 mole %, or, in some cases, at least 90 mole %, based on the total amount of all carboxylic acids used to make the polyester polyol. In certain embodiments, the di- or poly-functional polyester polyol comprises a reaction product of reactants comprising a dicarboxylic acid comprising glutaric acid, azelaic acid, 1,4-, 1,3- and/or 1,2-cyclohexanedicarboxylic acid, terephthalic acid, isophthalic acid, derivatives thereof, and/or mixtures thereof, employed in an amount of up to 20 mole %, such as up to 15 mole %, or, in some cases, up to 10 mole %, based on the total amount of all the carboxylic acids used to make the polyester polyol. In certain embodiments, the di- or poly-functional polyester polyol comprises a reaction product of reactants comprising a polyol comprising monoethylene glycol, 1,3-propanediol, butanediol-1,4, pentanediol-1,5, hexanediol-1,6, neopentyl glycol and/or a mixture thereof, employed in an amount of at least 80 mole %, at least 85 mole %, or, in some cases, at least 90 mole %, based on the total amount of all polyols used to make the polyester polyol. In certain embodiments, the di- or poly-functional polyester polyol comprises a reaction product of reactants comprising a polyol comprising diethylene glycol, hydroxypivalic acid neopentyl glycol, cyclohexanedimethanol, pentane-1,2-diol, nonane-1,9-diol, trimethylolpropane, glycerol, pentaerythritol, and/or a mixture thereof, employed in an amount of up to 20 mole %, such as up to 10 mole %, based on the total amount of all the polyols used to make the polyester polyol.

In certain embodiments, the di- or poly-functional polyester polyol comprises: (i) at least 50 percent by weight, such as 60 to 100 percent by weight, 70 to 100 percent by weight, 80 to 100 percent by weight, or, in some cases, 90 to 99 percent by weight, based on the total weight of the di- or poly-functional polyester polyol present in the composition, of a polyester polyol comprising a reaction product of reactants comprising (a) adipic acid (employed in an amount of at least 80 mole %, at least 85 mole %, or, in some cases, at least 90 mole %, based on the total amount of all carboxylic acids used to make the polyester polyol); and (b) butanediol-1,4 (employed in an amount of at least 80 mole %, at least 85 mole %, or, in some cases, at least 90 mole %, based on the total amount of all polyols used to make the polyester polyol); and (ii) up to 50 percent by weight, such as up to 40 percent by weight, up to 30 percent by weight, up to 20 percent by weight, or 1 to 10 percent by weight, based on the total weight of the di- or poly-functional polyester polyol present in the composition, of a polyester polyol comprising a reaction product of reactants comprising: (a) adipic acid (employed in an amount of at least 80 mole %, at least 85 mole %, or, in some cases, at least 90 mole %, based on the total amount of all carboxylic acids used to make the polyester polyol); (b) hexanediol-1,6, (employed in an amount of at least 40 mole %, such as 40 to 80 mole %, or, in some cases, 50 to 70 mole %, based on the total amount of all polyols used to make the polyester polyol) and; (c) neopentyl glycol (employed in an amount of up to 60 mole %, such as 20 to 60 mole %, or, in some cases, 30 to 50 mole %, based on the total amount of all polyols used to make the polyester polyol).

In some embodiments, in addition to the polyester polyol, such component (a) may include up to 50% by weight, such as up 40%, or, in some cases, up to 30% by weight, based on the total weight of component (a), of a di- or poly-functional polymeric polyol that is different from the polyester polyol, such as, for example, a polyether polyol and/or a polycarbonate polyol. In some embodiments, however, the polyester/polyurethane is substantially free, or in some cases completely free, of polyether units.

As indicated, the crystalline or semicrystalline polyester/polyurethane comprises a reaction product of reactants that comprises (b) a di- or poly-functional isocyanate component. Any desired organic compounds which have at least two free isocyanate groups per molecule can be used including, for example, diisocyanates according to the structure $Y(NCO)_2$ where Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Specific, but non-limiting, examples of such diisocyanates are tetramethylene diisocyanate, methylpentamethylene diisocyanate, hexamethylene diisocyanate ("HDI"), dodecamethylene diisocyanate, 1,4-diisocyanatocyclohexane, 1-isocyanato-3,3,5-trimethyl-5-isocyanatomethylcyclohexane ("IPDI"), 4,4'-diisocyanatodicyclohexylmethane, 4,4'-diisocyanatodicyclohexylpropane-(2,2), 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, and mixtures of two or more of these compounds.

Also suitable are higher-functionality polyisocyanates, or modified polyisocyanates, having, for example, carbodiimide groups, allophanate groups, uretdione groups, isocyanurate groups, urethane groups and/or biuret groups.

In some embodiments, the diisocyanate comprises an aliphatic and/or araliphatic diisocyanate such as HDI, 1,4-diisocyanatocyclohexane, 1-isocyanato-3,3,5-trimethyl-5-isocyanatomethylcyclohexane, 4,4'-diisocyanatodicyclohexylmethane and/or 4,4'-diisocyanatodicyclohexylpropane-(2,2).

In certain embodiments, the crystalline or semicrystalline polyester/polyurethane comprises a silane-containing polyester/polyurethane. Thus, in some embodiments, the crystalline or semicrystalline polyester/polyurethane is a reaction product of reactants further comprising (c) an alkoxysilane that, depending on the process used to make the polyester/polyurethane, includes either an isocyanate group or an isocyanate-reactive group, such as a thiol group and/or an aminic group. As used herein, "alkoxysilane" means a compound comprising a silicon atom, an alkoxy group and another organic group, in which the silicon atom is bonded with the organic group by a covalent bond.

For example, it is possible to make the silane-containing polyester/polyurethane by reacting a polyol, such as the polymeric polyol (a) or an OH-functional prepolymer produced by reacting the polymeric polyol (a) with a deficiency of isocyanate component (b), with an alkoxysilane comprising an isocyanate group. Examples of such alkoxysilanes, which are suitable for use, include, for example, isocyanate-functional dialkoxysilanes and trialkoxysilanes, such as, isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyldiethoxysilane.

In this embodiment for producing the silane-containing polyester/polyurethane, an OH-functional prepolymer can be produced by reaction of the polymeric polyol (a) with a deficiency of isocyanate component (b), wherein an NCO:OH ratio of 1:1.3 to 1:10, such as 1:1.5 to 1:3, is used.

Both the production of an OH-functional prepolymer and the reaction of the prepolymer with the alkoxysilane comprising an isocyanate group can be accelerated by suitable catalysis. To accelerate the NCO—OH reaction, catalysts, such as organotin compounds or amine catalysts, are suitable. The catalyst, where incorporated, is often employed in quantities of 0.001 to 5.0 wt. %, such as 0.001 to 0.1 wt. % and, in some cases, 0.005 to 0.05 wt. %, based on the solids content of the process product.

The reaction is often carried out at temperatures of 20 to 200° C., such as 40 to 120° C., or, in some cases, 60 to 100° C. The reaction may be continued until complete conversion of the NCO groups of the isocyanate-containing compound is achieved. The progress of the reaction can be monitored by means of suitable measuring instruments installed in the reaction vessel and/or by means of analyses on samples taken. Appropriate methods include viscosity measurements, measurements of the NCO content, the refractive index and the OH content, gas chromatography (GC), nuclear magnetic resonance (NMR) spectroscopy, infrared (IR) spectroscopy and near-infrared (NIR) spectroscopy. The NCO content of the mixture is often determined by a titrimetric method.

The process may be carried out continuously, e.g. in a static mixer, extruder or kneader, or batchwise, e.g. in a stirred reactor.

Another process for the production of the crystalline or semicrystalline silane-containing polyester/polyurethane is by reacting the isocyanate component (b) or an NCO-functional prepolymer produced by reacting the polymeric polyol (a) with an excess of isocyanate component (b) with an alkoxysilane comprising an isocyanate-reactive group, such as an aminic groups or a thiol group. In certain embodiments, the amounts of the components used in the reaction to make such an NCO-functional prepolymer are selected so as to provide an NCO:OH ratio of 1.3:1.0 to 2:1, such as 1.5:1.0 to 2:1. As with the first process, this urethanisation can also be accelerated by catalysis; the temperature ranges of the reaction are also analogous.

In this embodiment, the reaction is continued until complete conversion of the OH groups of the polyols is achieved. The progress of the reaction may be monitored by checking the NCO content and is complete when the appropriate theoretical NCO content is reached. This can be followed by suitable measuring instruments installed in the reaction vessel and/or by means of analyses on samples taken. Appropriate methods viscosity measurements, measurements of the NCO content, the refractive index and the OH content, GC, NMR spectroscopy, IR spectroscopy and NIR spectroscopy. The NCO content of the mixture is often determined by a titrimetric method.

In these methods, an isocyanate component (b) and/or a NCO functional prepolymer is reacted with an isocyanate-reactive alkoxysilane, such as an isocyanate-reactive dialkoxysilane and/or trialkoxysilane, including, for example, an aminic-functional alkoxysilane and/or thiol-functional alkoxysilane, examples of which include, but are not limited to, mono-silanes and bis-silanes, specific examples of which include, but are not limited to, N(β-aminoethyl), γ-aminopropyltrimethoxysilane, bis(trimethoxysilylpropyl)amine, aminopropyltrimethoxysilane, mercaptopropyltrimethoxysilane, aminopropylmethyldimethoxysilane, mercaptopropylmethyldimethoxysilane, aminopropyltriethoxysilane, mercaptopropyltriethoxysilane, aminopropylmethyldiethoxysilane, mercaptopropylmethyldiethoxysilane, aminomethyltrimethoxysilane, aminomethyltriethoxysilane, (aminomethyl)methyldimethoxysilane, (aminomethyl)methyldiethoxysilane, N-butylaminopropyltrimethoxysilane, and/or N-phenylaminopropyltrimethoxysilane.

In certain embodiments, the component (c) is used in an amount of 0.1 to 10 percent by weight, such as 0.2 to 2 percent by weight or, in some cases, 0.5 to 1.5 percent by weight, based on the total weight of the reactants used to make the polyester/polyurethane.

In certain embodiments, the crystalline or semicrystalline polyester/polyurethane comprises a reaction product of reactants further comprising (d) a di- or poly-functional polyol with a molecular weight of from 62 to 399 g/mole. Examples of component (d) are polymers, such as polyethers, polyesters, polycarbonates, polylactones and/or polyamides. Also suitable for use as a component (d) are polyhydric, including dihydric, alcohols mentioned earlier with respect to the preparation of the polyester polyols and include, for example, monomeric polyols such as ethanediol, diethylene glycol, 1,2-propanediol, dipropylene glycol, 1,3-propanediol, 1,4-butanediol, 1,3-butanediol, 2,3-butanediol, 1,5-pentanediol and 1,6-hexanediol.

In certain embodiments, the component (d) is used in an amount of 0.1 to 10 percent by weight, such as 0.1 to 2 percent by weight or, in some cases, 0.1 to 1 percent by weight, based on the total weight of the reactants used to make the polyester/polyurethane.

In certain embodiments, particularly those in which the crystalline or semicrystalline polyester/polyurethane is sought to be present as a stable dispersion in an aqueous composition, the crystalline or semicrystalline polyester/polyurethane comprises a reaction product of reactants further comprising (e) a dispersant compound that contains ionic groups or potentially ionic groups, which may be either cationic or anionic in nature, and which has at least one isocyanate-reactive group, such as a hydroxyl, thiol, and/or aminic group. Suitable cationic and anionic groups include, for example, sulfonium groups, ammonium groups, phosphonium groups, carboxylate groups, sulfonate groups, phosphonate groups, or the corresponding non-ionic acid groups (i.e., potentially ionic groups) that can be converted by deprotonation (i.e., salt formation) into these groups.

Suitable ionic or potentially ionic compounds include, for example, mono- and di-hydroxycarboxylic acids; mono- and di-aminocarboxylic acids; mono- and di-hydroxysulfonic acids; mono- and di-aminosulfonic acids; mono- and di-hydroxyphosphonic acids; mono- and di-aminophosphonic acids; and their salts, including combinations thereof. Examples of suitable specific compounds include, without limitation, dimethylolpropionic acid, dimethylolbutyric acid, hydroxypivalic acid; N-(2-aminoethyl)-p-alanine; 2-(2-aminoethylamino) ethanesulfonic acid; ethylenediame-propyl- or butyl-sulfonic acid; 1,2- or 1,3-propylenediamine-β-ethylsulfonic acid; citric acid; glycolic acid; lactic acid; glycine; alanine; taurine; lysine; 3,5-diaminobenzoic acid; an adduct of IPDI and acrylic acid and its alkali metal and/or ammonium salts; an adduct of sodium bisulfite with but-2-ene-1,4-diol; polyethersulfonate; and the propoxylated adduct of 2-butenediol and $NaHSC_3$.

Suitable compounds for use in component (e) also include other 2,2-bis(hydroxymethyl)alkane-carboxylic acids, such as dimethylolacetic acid and 2,2-dimethylolpentanoic acid, dihydroxysuccinic acid, Michael adducts of acrylic acid with amines such as isophoronediamine or hexamethylenediamine, or mixtures of such acids and/or dimethylolpropionic acid and/or hydroxypivalic acid, sulfonic acid diols optionally comprising ether groups, for example, the compounds described in U.S. Pat. No. 4,108,814 at col. 3, ln. 13 to col. 5, ln. 2, the cited portion of which being incorporated herein by reference.

Dispersant compounds reactive towards isocyanate groups may contain hydrophilic ether groups that impart aqueous dispersability to macromolecules covalently incorporating the dispersant compounds. Suitable compounds include, for example, polyether polyols and polyether polyamines. Exemplary compounds include, but are not limited to, alcohol-derived polyethylene glycols, polypropylene glycols, copolymers thereof, and monomethyl ethers thereof.

Suitable compounds for use in component (e) containing sulfonate or carboxylate groups are, for example, diamino compounds or dihydroxy compounds which have sulfonate and/or carboxylate groups, such as, for example, the sodium, lithium, potassium and tert-amine salts of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, of the analogous carboxylic acids, of dimethylolpropionic acid, of dimethylolbutyric acid or of the reaction products of a Michael addition of 1 mole of diamine, such as e.g. 1,2-ethanediamine or isophoronediamine, with 2 mole of acrylic acid or maleic acid.

The acids are often employed directly in their salt form as sulfonate or carboxylate. However, it is also possible for a proportion or the entire neutralizing agent needed for the salt formation to be first added during or after the preparation of the polyurethanes. Tert-amines which are suitable for the salt formation are e.g. triethylamine, dimethylcyclohexylamine and/or ethyldiisopropylamine. Other amines can also be employed for the salt formation, such as e.g. ammonia, diethanolamine, triethanolamine, dimethylethanolamine, methyldiethanolamine, aminomethylpropanol and also mixtures thereof. These amines are usually added only after the isocyanate groups have largely reacted. It is also possible to employ other neutralizing agents, such as e.g. sodium, potassium, lithium or calcium hydroxide.

In certain embodiments, the component (e) is used in an amount of 0 percent by weight to 20 percent by weight, such as 0.1 percent by weight to 20 percent by weight, 0.5 percent by weight to 20 percent by weight or, in some cases, 1 percent by weight to 15 percent by weight, based on the total weight of the reactants used to make the polyester/polyurethane.

In certain embodiments, the crystalline or semicrystalline polyester/polyurethane comprises a reaction product of reactants further comprising a component (f) comprising an aminic chain extender, such as monoamino and/or diamino compounds. Chain extenders in the context of the invention also include monoamines, which lead to chain termination, and mixtures thereof.

Examples of suitable monoamine chain extenders are aliphatic and/or alicyclic, primary and/or secondary monoamines such as ethylamine, diethylamine, the isomeric propyl- and butylamines, higher linear-aliphatic monoamines and cycloaliphatic monoamines such as cyclohexylamine. Further examples are amino alcohols, i.e. compounds which contain amino and hydroxyl groups in one molecule, for example ethanolamine, N-methylethanolamine, diethanolamine or 2-propanolamine. Further examples are monoamino compounds which additionally bear sulphonic acid and/or carboxy groups, for example taurine, glycine or alanine.

Examples of suitable diamino chain extenders are 1,2-ethanediamine, 1,6-hexamethylenediamine, 1-amino-3,3,5-trimethyl-5-aminomethylcyclohexane (isophoronediamine), piperazine, 1,4-diaminocyclohexane or bis(4-aminocyclohexyl)methane. In addition, adipic dihydrazides, hydrazines or hydrazine hydrates are useful. It is also possible to use polyamines such as diethylenetriamine in place of a diamino compound as a formation component.

In certain embodiments, component (f) is used in an amount of 0.1 to 10 percent by weight, such as 0.1 to 2 percent by weight or, in some cases, 0.1 to 1 percent by weight, based on the total weight of the reactants used to make the polyester/polyurethane.

In certain embodiments, the crystalline or semicrystalline polyester/polyurethane comprises a reaction product of reactants further comprising a component (g) comprising other isocyanate-reactive compounds, such as aliphatic, cycloaliphatic or aromatic monoalcohols having 2 to 22 carbon atoms, such as ethanol, butanol, hexanol, cyclohexanol, isobutanol, benzyl alcohol, stearyl alcohol and 2-ethylethanol; mono- or difunctional polyethers which are based on ethylene oxide polymers or ethylene oxide/propylene oxide copolymers started on alcohols or amines and have a hydrophilizing action; blocking agents which are usual for isocyanate groups and can be split off again at elevated temperature, such as butanone oxime, dimethylpyrazole, caprolactam, malonates, triazole, dimethyltriazole, tert-butylbenzylamine and cyclopentanone carboxyethyl ester; and unsaturated compounds containing groups accessible for polymerization reactions, such as hydroxyethyl acrylate, hydroxyethyl methacrylate, hydroxybutyl acrylate, hydroxybutyl methacrylate, hydroxypropyl acrylate, hydroxypropyl methacrylate, pentaerythritol trisacrylate and hydroxy-functional reaction products of monoepoxides, bisepoxides and/or polyepoxides with (meth)acrylic acid.

In some embodiments, the sum of the weight percentages of (a) through (g), or any subset thereof, such as the sum of (a) through (f), totals 100%.

The crystalline or semicrystalline polyester/polyurethane can be prepared by any of a variety of processes, such as emulsifier/shear-force, acetone, prepolymer-mixing, melt-emulsification, ketimine, and spontaneous solids-dispersing processes, such as is described in Methoden der Organischen Chemie, Houben-Weyl, 4th ed., Vol. E20/Part 2, p. 1682, Georg Thieme Verlag, Stuttgart, 1987.

In some embodiments, such as those in which the polyester/polyurethane is provided as a stable dispersion in an aqueous composition, the acetone process is used to prepare the polyester/polyurethane. To this end, prepolymers of components A and B, and if appropriate any of C, D, E, and/or G, are dissolved in acetone and chain-extended with component F. After dispersion with water, the acetone is distilled off. The acetone process is described in U.S. Pat. No. 3,479,310 and GB 1,076,788. Other suitable processes for making aqueous polymeric dispersions are described in DE-OS 2 725 589 and U.S. Pat. Nos. 4,269,748, 4,192,937, 4,292,226, and 3,756,992.

Aqueous dispersions of crystalline or semicrystalline polyester/polyurethanes that are suitable for use herein are commercially available and include, for example, Dispercoll® U 53, U54, U 56 and U 8755, available from Covestro LLC, Pittsburgh, Pa.

As indicated, it was surprisingly discovered that the % UCS retention (measured as described in the Examples) of coated particle proppants of the present specification could be dramatically improved by inclusion of just a small amount (as described below) of such crystalline or semicrystalline polyester/polyurethane in the coating. Thus, in certain embodiments, such crystalline or semicrystalline polyester/polyurethane is present in an amount of just 0.01 to 1% by weight, such as 0.01 to 0.5% by weight, 0.1 to 0.5% by weight, 0.1 to 0.4% by weight, or 0.2 to 0.4% by weight, based on the total weight of the coated particles.

The coated particles of this specification may also include a solid particle anti-clumping agent. Anti-clumping agents are materials that, when present in an effective amount, act to prevent the coated particles of the present specification from clumping or aggregating, thereby enabling the production of free-flowing and pourable particles.

Suitable solid anti-clumping agents include, for example, silica, such as fumed silica, organic bentonite, hydrogenated castor oil and polyamides. In certain embodiments, the anti-clumping agents do not impart any color to the coating when viewed by the naked eye and, as such, do not act as a colorant.

In certain embodiments, the solid particle anti-clumping agent has an average particle size of at least 0.1 microns, such as at least 0.5 microns and no more than 10 microns, such as no more than 5 microns.

In certain embodiments, the solid particle anti-clumping agent is employed in an amount effective to produce free-flowing, pourable particles. In certain embodiments, the solid particle anti-clumping agent, such as fumed silica, is present in an amount of at least 0.1% by weight, such as 0.1 to 1% by weight or, in some cases, 0.1 to 0.4% by weight, based on the total weight of the coated particles.

Embodiments of the present specification are directed to methods of making free-flowing particles. In some embodiments, the coated particles described herein are prepared by first drying the substrate particle, such as by, for example, heating the substrate particle to a temperature of, for example, at least 50° C., such as at least 80° C. or at least 90° C. If desired, an aminosilane, as described above, may be added to the dried substrate particles, preferably while mixing. The isocyanate-reactive composition is then added to the substrate particles while mixing, followed by addition of the isocyanate-functional component, and the condensation reaction is allowed to take place, followed by addition of an aqueous dispersion of a crystalline or semicrystalline polyester/polyurethane, if used. Finally, the coated particles thereby produced are mixed with a solid particle anti-clumping agent.

In certain embodiments, the reaction mixture is present in an amount of at least 0.1% by weight, such as at least 1% by weight or at least 2% by weight and up to 10% by weight, up to 5% by weight, or, in some cases, up to 4% by weight, based on the total weight of substrate particles. The reaction mixture can be present in any amount between any combination of these upper and lower values, inclusive, e.g., from 0.1 to 10% by weight, 1% to 5% by weight, 2% to 5% by weight or 2% to 4% by weight, based on the total weight of substrate particles present.

It was also discovered, surprisingly, that a multi-step coating process can dramatically improve the % UCS retention (measured as described in the Examples) of coated particle proppants of the present specification. According to this process, the substrate particle is first dried, such as by, for example, heating the substrate particle to a temperature of, for example, at least 50° C., such as at least 80° C. or at least 90° C. If desired, an aminosilane, as described above, may be added to the dried substrate particles, preferably while mixing. Then, a portion of the isocyanate-reactive composition, such as up to 50% by weight of the total amount to be used, is then added to the substrate particles while mixing, followed by addition of a portion of the isocyanate-functional component, and the condensation reaction is allowed to take place. Thereafter, the remaining portion of the isocyanate-reactive composition and the isocyanate-functional component are added, in one or more additional steps, followed by addition of an aqueous dispersion of a crystalline or semicrystalline polyester/polyurethane, if used. Finally, the coated particles thereby produced are mixed with a solid particle anti-clumping agent.

As will be appreciated, therefore, the present specification is also directed to methods for making coated particles that include (1) mixing substrate particles having a particle size of no more than 3 mesh (such as any of those substrate particles described above) with a first portion of an isocyanate-reactive composition (such as any of the isocyanate-reactive compositions described above) and a first portion of a liquid isocyanate-functional component (such as any of the liquid isocyanate-functional components described above), (2) allowing a condensation reaction between the first portion of the isocyanate-reactive composition and the first portion of the liquid isocyanate-functional component to take place to form coated particles, and then (3) mixing the coated particles produced thereby with a second (and optionally a third) portion of the isocyanate-reactive composition and a second (and optionally a third) portion of the isocyanate-functional component in one or more additional steps in which a condensation reaction between each subsequent portion of the isocyanate-reactive composition added and each subsequent portion of the liquid isocyanate-functional component added is allowed to take place prior to the addition of a further portion of the isocyanate-reactive composition and a further portion of the liquid isocyanate-functional component. Additional components, such as coupling agent, crystalline or semicrystalline polyester/polyurethane and/or solid particle anti-clumping agent can be added as described above.

The coated particles described herein can be used in a variety of applications. In certain embodiments, however, the coated particles of the present specification are thought to be suitable for use in hydraulic fracturing a geologic formation. In these embodiments, the coated particles may be combined with a carrier fluid, such as water and/or a hydrocarbon, and the mixture injected at elevated pressure into a well bore to an underground geologic formation. When the pressure in the formation resulting from the injection exceeds the strength of the formation, a fracture is formed and the coated particles, i.e., proppant, are placed in the formation in an effort to maintain the fracture in a propped position when the injection pressure is released. Upon ceasing the injection of fluid, it is desired that the proppant forms a pack that serves to hold open the fractures, thereby providing a highly conductive channel through which a desired material, such as water, oil, or gas (including natural gas) can flow to the well bore for retrieval.

In certain embodiments, therefore, the coated particles are used in a method of forming a proppant composition that includes suspending the coated particles described herein in a carrier fluid to form a suspension and injecting the suspension into an underground geologic formation.

The coated particles described herein can be injected as the sole proppant or as a partial replacement for an existing proppant. For example, if desired, the coated particles described herein may comprises 1 to 99 percent by weight, such as 10 to 90 percent by weight, or, in some cases, 10 to 50 percent by weight, based on the total weight of the proppant present in the composition that is injected into the well bore. In some embodiments, an uncoated proppant is first placed in a well, and thereafter a proppant of the coated particles described herein is placed in the fracture nearest to the wellbore or fracture openings.

The coated particles of the present specification are presently thought to provide several advantages, particularly in the context of hydraulic fracturing. For example, the coated particles produced as described herein are characterized by a very high UCS and good shelf stability, i.e., the ability to retain UCS over time as described in the Examples.

The non-limiting and non-exhaustive examples that follow are intended to further describe various non-limiting and non-exhaustive embodiments without restricting the scope of the embodiments described in this specification.

EXAMPLES

Examples 1-8

All quantities given in "parts" and "percents" are understood to be by weight, unless otherwise indicated. The following materials were used in the formulations of the examples:

Preparation of Coated Particles

Coated sand particles were produced using the ingredients and amounts (in parts) listed in Table 1.

TABLE 1

| Component | Example 1 | Example 2 | Example 3 | Example 4 | Example 5 | Example 6 | Example 7 | Example 8 |
|---|---|---|---|---|---|---|---|---|
| SAND[1] | 1362 | 1362 | 1362 | 1362 | 1362 | 1362 | 1362 | 1362 |
| COUPLING AGENT[2] | 1.8 | 1.8 | 1.8 | 1.8 | 1.8 | 1.8 | 1.8 | 1.8 |
| POLYOL[3] | 26 | 26 | 26 | 26 | 26 | 26 | 26 | 26 |
| SURFACTANT[4] | 2.7 | 2.7 | 2.7 | 2.7 | — | — | — | — |
| ISOCYANATE 1[5] | 16 | 16 | 16 | 16 | — | — | — | — |
| ISOCYANATE 2[8] | — | — | — | — | 16 | 16 | — | — |
| ISOCYANATE 3[9] | — | — | — | — | — | — | 16 | — |
| ISOCYANATE 4[10] | — | — | — | — | — | — | — | 16 |
| PUD[6] | 0 | 1 | 3 | 5 | 3 | 5 | 3 | 3 |
| SILICA[7] | 2.7 | 2.7 | 2.7 | 2.7 | 2.7 | 2.7 | 2.7 | 2.7 |

[1]20/40 (20-40 mesh) sand
[2]γ-aminopropyltriethoxysilane, commercially available from Momentive Performance Materials
[3]a mixture of 70 parts by weight of Honey Bee ™ Polyol HB-230 (a polyester polyol derived from soybean oil having a hydroxyl functionality of ~2 and hydroxyl number of 220-240 mg KOH/gm and having the structure described with reference to FIG. 4 of U.S. Pat. No. 8,828,269); 30 parts by weight of 1-methyl-3,5-diethyl-2,4-diaminobenzene; 0.1 parts by weight of Dabco ® 33-LV (an amine catalyst commercially available from Sigma-Aldrich); 0.1 parts by weight of Dabco ® T-12 (dibutyltin dilaurate commercially available from Evonik); and 0.1 parts by weight of Reactint ® X17AB (a polymeric colorant commercially available from Milliken Chemical).
[4]A mixture of 73 parts by weight DAWN ® dish soap and 27 parts by weight water.
[5]a urethane-modified diphenylmethane diisocyanate (PMDI) prepolymer having an NCO content of about 30.4, a functionality of about 2.8, and a viscosity at 25° C. of 235-435 mPa · s that is prepared by reacting an excess of a polymethylene poly(phenyl isocyanate) with a polyester polyol having a number average molecular weight of about 450 as described in U.S. Pat. No. 5,962,541.
[6]An aqueous dispersion of a crystalline anionic polyester/polyurethane, commercially available as Dispercoll ® U 8755 from Covestro LLC.
[7]Untreated fumed silica, commercially available as CAB-O-SIL ® M5 available from Cabot.
[8]a medium functionality p-MDI containing 65% by weight MDI and 29% by weight 2,4-MDI, based on the total weight of MDI.
[9]a mixture of 2,2'-MDI, 2,4'-MDI and 4,4-MDI that contains 55% by weight of 2,4'-MDI, based on the total weight of MDI.
[10]a medium functionality p-MDI containing 49% by weight MDI and 28% by weight 2,4'-MDI, based on the total weight of MDI.

To produce the coated sand particles, the SAND was pre-dried for a minimum of 2 hours in an oven heated to 93° C. The SAND was then transferred to a suitable vessel, equipped with a mixer, and mixed at a slow speed. The COUPLING AGENT was then added to the SAND over a period of about 15 seconds. Thereafter, the POLYOL was added over a period of 30 seconds and the mixing speed was increased. Next, the SURFACTANT (if used) was added over a period of 15 seconds, followed by addition of ISOCYANATE over a period of 30 seconds with increased mixing speed. The PUD (if used) was then added over a period of 10 seconds and the coated sand was allowed to mix at high speed for two minutes. The mixing was then stopped and the SILICA was added by dumping the SILICA into the coated sand. Mixing was then resumed at high speed for two minutes and then the mixing was stopped and the coated sand poured from the vessel.

Testing and Results.

The coated sands produced in examples 1-6 were tested to determine their initial UCS and their UCS after aging for 2 weeks at ambient conditions (about 20° C. (68° F.) and 1 atm absolute pressure (14.7 psia)) (referred to below as "UCS Aged") according to the following procedure.

80 grams of the coated sand (80 g) was mixed with 200 mL of a 2% KCl or linear fluid and poured into 1⅛ inch long High Pressure High Temperature Safe cell from Proptester, Inc. The liquid was drained and the cell was pressurized to 1000 psi using nitrogen and kept at that pressure for 24 hours and 150° F. Afterwards, the cell was depressurized and the puck thus formed was carefully taken out and its strength tested by crushing the consolidated proppant pack using an Instron® hydraulic press. The pressure was applied slowly (100 psi/min) on the puck and the pressure at which the puck was catastrophically broken was recorded. The UCS load in psi was recorded as the point where catastrophic failure of the consolidated proppant pack occurred. Results are set forth in Table 2.

TABLE 2

| Example No. | UCS Initial | UCS Aged | % UCS Retention |
|---|---|---|---|
| 1 | 200 psi (1379 kPa) | 60 psi (414 kPa) | 30% |
| 2 | 180 psi (1241 kPa) | 75 psi (517 kPa) | 42% |
| 3 | 180 psi (1241 kPa) | 110 psi (758 kPa) | 61% |
| 4 | 180 psi (1241 kPa) | 140 psi (965 kPa) | 78% |
| 5 | 200 psi (1379 kPa) | 180 psi (1241 kPa) | 90% |
| 6 | 220 psi (1517 kPa) | 209 psi (1441 kPa) | 95% |
| 7 | 195 psi (1344 kPa) | 175 psi (1206 kPa) | 90% |
| 8 | 150 psi (1034 kPa) | 110 psi (7584 kPa) | 73% |

Examples 9-11

Preparation of Coated Particles

For Example 9, coated sand particles were produced using the ingredients and amounts (in grams) listed in Table 3.

TABLE 3

| Component | Amount (in parts) |
|---|---|
| SAND[1] | 1362 |
| COUPLING AGENT[2] | 1.8 |
| POLYOL[3] | 8 |
| SURFACTANT[4] | 3.6 |
| ISOCYANATE 1[5] | 13 |
| PUD[6] | — |
| SILICA[7] | — |

To produce the coated sand particles of Example 9, the SAND was first coated using the procedure described above for Examples 1-8, except that the PUD and SILICA additions were omitted.

To produce the coated sand of Example 10, 1391 grams of the coated sand produced in Example 9, was mixed with 8 parts of POLYOL over 10 seconds and then 13 parts ISOCYANATE 1 was added over 10 seconds.

To produce the coated sand of Example 11, 1362 grams of the coated sand produced in example 10, was mixed with 8 parts POLYOL over 10 seconds and then 13 parts ISOCYANATE 1 was added over 10 seconds. The mixing was then stopped and 2.7 parts of SILICA was added by dumping the SILICA into the coated sand. Mixing was then resumed at high speed for two minutes and then the mixing was stopped and the coated sand poured from the vessel.

Testing and Results.

The coated sands produced in Examples 9-11 were tested to determine their initial UCS and their UCS Aged using the procedure described above for Examples 1-8. Results are in Table 4.

TABLE 4

| Example No. | UCS Initial | UCS Aged | % UCS Retention |
|---|---|---|---|
| 1 | 200 psi (1379 kPa) | 60 psi (414 kPa) | 30% |
| 9 | 14 psi (97 kPa) | 23 psi (159 kPa) | 164% |
| 10 | 105 psi (724 kPa) | 111 psi (765 kPa) | 106% |
| 11 | 250 psi (1724 kPa) | 210 psi (1448 kPa) | 84% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Coated particles comprising:
   (a) substrate particles having a particle size of no more than 3 mesh; and
   (b) a coating disposed over at least a portion of the particles, wherein the coating comprises a condensation reaction product of a reaction mixture comprising:
      (i) a methylene diphenyl diisocyanate mixture comprising at least 10 percent by weight of 2,4'-methylene diphenyl diisocyanate and/or 2,2'-methylene diphenyl diisocyanate, based on the total weight of the mixture; and
      (ii) an isocyanate-reactive composition comprising:
         (A) a plant oil polyester polyol;
         (B) an aromatic diamine; and
         (C) a catalyst for the reaction between hydroxyl groups and isocyanate groups, wherein the plant oil polyester polyol is present in an amount of at least 60% by weight, based on the total weight of isocyanate-reactive components present in the isocyanate-reactive composition and the aromatic diamine is present in an amount of 10 to 40% by weight, based on the total weight of the total weight of isocyanate-reactive components present in the isocyanate-reactive composition.

2. The coated particles of claim 1, wherein the substrate particles comprise sand particles.

3. The coated particles of claim 1, wherein the methylene diphenyl diisocyanate mixture comprises at least 15 percent by weight of 2,4'-methylene diphenyl diisocyanate, based on the total weight of the mixture.

4. The coated particles of claim 1, wherein the methylene diphenyl diisocyanate mixture comprises at least 25 percent by weight of 2,4'-methylene diphenyl diisocyanate, based on the total weight of methylene diphenyl diisocyanate monomer in the mixture.

5. The coated particles of claim 1, wherein the plant oil comprises soybean oil.

6. The coated particles of claim 1, wherein the reaction mixture has an NCO Index of 180 to 400.

7. The coated particles of claim 1, wherein the coating further comprises a crystalline or semicrystalline polyester/polyurethane having a decrystallization temperature of at least 35° C.

8. The coated particles of claim 7, wherein the crystalline or semicrystalline polyester/polyurethane is present in an amount of 0.01 to 1% by weight, based on the total weight of the coated particles.

9. The coated particles of claim 8, wherein the crystalline or semicrystalline polyester/polyurethane is present in an amount of 0.1 to 0.4% by weight, based on the total weight of the coated particles.

10. A method of using the coated particles of claim 1, comprising:
(a) combining the coated particles with a carrier fluid to form a mixture, and
(b) injecting the mixture into a well bore to an underground geologic formation.

* * * * *